us

(12) United States Patent
Ait-Yahiatene

(10) Patent No.: US 9,696,550 B2
(45) Date of Patent: Jul. 4, 2017

(54) DEVICE FOR IMPROVING THE VISION OF A HUMAN EYE

(71) Applicant: LIGHT VISION, Courbevoie (FR)

(72) Inventor: Daniel Ait-Yahiatene, Suresnes (FR)

(73) Assignee: LIGHT VISION, Courbevoie (FR)

( * ) Notice: Subject to any disclaimer, the term of this patent is extended or adjusted under 35 U.S.C. 154(b) by 240 days.

(21) Appl. No.: 14/650,668

(22) PCT Filed: Nov. 27, 2013

(86) PCT No.: PCT/FR2013/000310
§ 371 (c)(1),
(2) Date: Jun. 9, 2015

(87) PCT Pub. No.: WO2014/091091
PCT Pub. Date: Jun. 19, 2014

(65) Prior Publication Data
US 2016/0187649 A1    Jun. 30, 2016

(30) Foreign Application Priority Data

Dec. 10, 2012 (FR) .................................... 12 03345

(51) Int. Cl.
*H04N 7/18*    (2006.01)
*G02B 27/01*   (2006.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
CPC .................................................. G02B 27/0172
See application file for complete search history.

(56) References Cited

U.S. PATENT DOCUMENTS

| 5,144,459 A | 9/1992 | Felske et al. |
| 6,227,667 B1 * | 5/2001 | Halldorsson ......... G02B 27/017 351/206 |

(Continued)

FOREIGN PATENT DOCUMENTS

| EP | 0216692 | 4/1987 |
| FR | 2766931 | 2/1999 |
| FR | 2964755 | 3/2012 |

OTHER PUBLICATIONS

International Search Report dated Jan. 24, 2014, corresponding to PCT/FR2013/000310.

*Primary Examiner* — Tracy Y Li
(74) *Attorney, Agent, or Firm* — Young & Thompson

(57) ABSTRACT

A device for improving the vision of an eye of a human being includes optical elements for forming an image of a scene; a controllable projector having an input and mounted to co-operate with the optical elements, and suitable for outputting a beam; a mirror; elements for linking the mirror to the orbit and to the projector in such a manner that the optical axis of the mirror passes through the center of rotation of the eye and that the mirror is on the light path of the beam; a sensor for determining the rotation of the eye relative to its orbit, and elements for applying the signal output from the sensor to the input of the projector so as to cause the image light beam to be projected on a location of the mirror that is a function of the rotation of the eye in its orbit.

8 Claims, 2 Drawing Sheets

(51) Int. Cl.
*G02B 27/00* (2006.01)
*G09B 21/00* (2006.01)

(52) U.S. Cl.
CPC ....... *G02B 27/0179* (2013.01); *G09B 21/008* (2013.01); *G02B 2027/014* (2013.01); *G02B 2027/0145* (2013.01); *G02B 2027/0174* (2013.01); *G02B 2027/0187* (2013.01)

(56) References Cited

U.S. PATENT DOCUMENTS

| | | | |
|---|---|---|---|
| 6,504,658 B1 | 1/2003 | Bignolles et al. | |
| 8,016,421 B2* | 9/2011 | Eberl | A61B 3/113 351/159.52 |
| 2006/0072215 A1* | 4/2006 | Nishi | G02B 13/06 359/708 |
| 2007/0100251 A1* | 5/2007 | Prichep | A61B 5/04009 600/544 |
| 2007/0159598 A1* | 7/2007 | Yancey | A61B 3/024 351/206 |
| 2010/0149073 A1* | 6/2010 | Chaum | G02B 27/0093 345/8 |
| 2012/0062372 A1* | 3/2012 | Augst | G06K 9/00798 340/435 |
| 2013/0190736 A1* | 7/2013 | Fabrikant | A61F 9/00804 606/5 |

* cited by examiner

US 9,696,550 B2

1

DEVICE FOR IMPROVING THE VISION OF A HUMAN EYE

The present invention relates to devices for improving the vision of a human being, the device finding a particularly advantageous application for improving the vision of a human being having at least one eye suffering from age-related macular degeneration (ARMD), but also in numerous other applications, e.g. industrial, military, and civilian applications.

ARMD is a disease of the retina that can be defined as follows: "A set of degenerative lesions of the macular region that are not inflammatory, and acquired, and that arise in an eye that was previously normal, appearing after the age of fifty years and leading to degradation of the macular function and of central vision".

The precise causes of this disease are not known and it is not yet known at present how to cure it. Existing treatments serve only to slow down its progression.

Thus, in order to compensate for this loss of vision, devices have been developed for improving the vision of an eye suffering from ARMD, e.g. the devices described in FR 2 964 755, and incidentally in FR 2 766 931 and EP 0 216 692.

Figure 2:
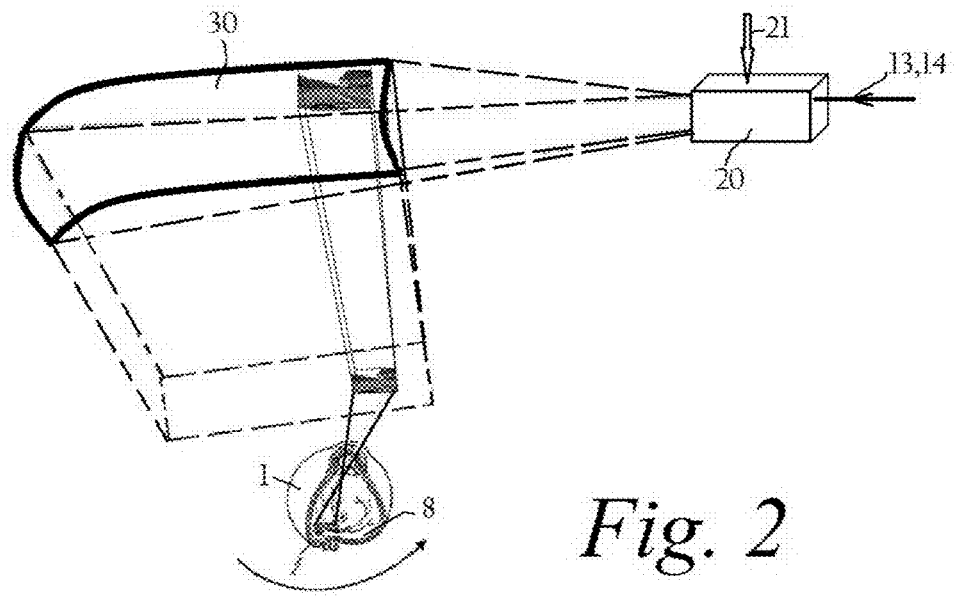

More particularly, the device of FR 2 964 755 enables the vision of an eye of a human being to be improved, with the eye pivoting in its orbit and having a lens and a retina with a zone suffering from age-related macular degeneration (ARMD). The device described in that patent gives good results but presents drawbacks, in particular because it includes moving elements and/or parts that, as a general rule, are naturally less reliable than stationary elements, and that also consume energy, which involves using sources of energy that are relatively bulky and need recharging frequently. With reference more particularly to FIG. 2 of that document, this applies for example to the deflector given reference 50 that is constituted by a set of elements that need to move in order to achieve the looked-for result, e.g. the mirrors on rails associated with the motors that control them.

Thus, the present invention has the object of providing a device for improving the vision of an eye of a human being and that mitigates to a considerable extent the drawbacks of prior art devices, regardless of their intended applications, the device not having moving elements and thus being simpler and more reliable than similar devices of the prior art.

More precisely, the present invention provides a device for improving the vision of an eye of a human being, said eye pivoting in its orbit and including a lens and a retina, the device being more particularly as defined in the accompanying claim.

Figure 1:
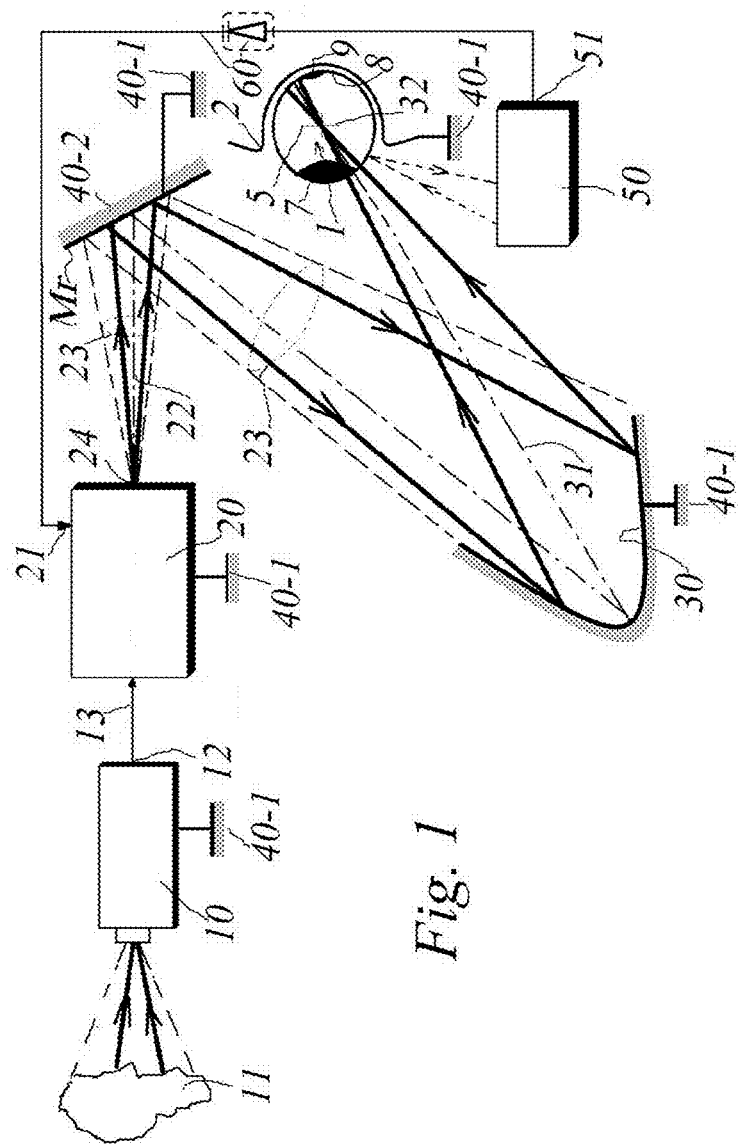
Figure 3:
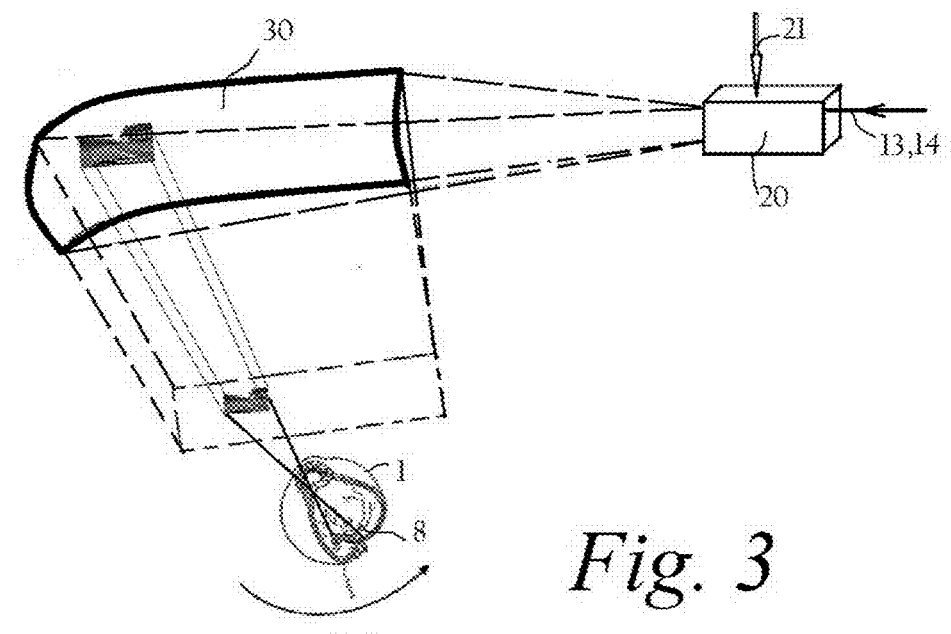

Other characteristics and advantages of the present invention appear from the following description made with reference to the accompanying drawings and given by way of non-limiting illustration, and in which:

FIG. 1 is a block diagram of an embodiment of the device of the invention for improving the vision of an eye of a human being when the eye is suffering from ARMD; and FIGS. 2 and 3 are highly diagrammatic views of a portion of the FIG. 1 device in two different states in order to explain its operation.

It is specified initially that the entire description of FR 2 934 755 together with the drawings accompanying it should be considered as being incorporated in the present description.

2

It is also specified that the figures show one embodiment of the subject matter of the invention, but that other embodiments can exist that satisfy the definition of the invention.

It is also specified that, in the present description, if the adverb "substantially" is associated with a qualifier of given means, then the qualifier should be understood either in its strict meaning or in an approximate meaning.

The present invention relates to a device for improving the vision of an eye 1 of a human being, the eye pivoting in its orbit 2 and having a lens 7 and a retina 8.

With reference more particularly to FIG. 1, the device comprises optical means 10 for forming at least one image of a scene for viewing 11, an optical projector 20 for performing treatment that is controllable, e.g. by a microprocessor or the like, and that is mounted in co-operation 13, 14 with optical means 10, the projector being suitable: i) for outputting 24 the image in the form of an image light beam 22; and ii) for being controlled by a signal of determined value that is applied to a control input 21 so that the image light beam 22 is deflected through a deflection angle that is a function of the value of the signal.

Such a controllable treatment optical projector 20 may be of various forms, depending on the nature of the image delivered at the output 24 from the optical means 10, which means may be of electronic type or even of purely optical type.

In a particularly advantageous embodiment, when it is connected to the output of a video camera or the like that delivers an image in the form of digital information signals, the optical projector 20 is a projector such as that sold by the supplier "Texas Instruments" under the trademark "DMD Discovery™ 3000".

The device also has a mirror 30, and means 40-1, 40-2 for linking the mirror 30 with the orbit 2 and with the treatment optical projector 20 so that the optical axis 31 of the mirror 30 passes substantially constantly through the center of rotation 5 of the eye 1 and the mirror 30 is on the light path of the above-defined image light beam 22.

These link means 40-1, 40-2 that are shown diagrammatically in FIG. 1, may, by way of example, be very preferentially of the same type as those described in above-mentioned FR-A-2 964 765 in the name of the Applicant, and as shown in FIG. 3 of that document. In the present description they are referred to by the generic term "glasses" because of their similarity with that well-known vision device.

It is specified that the reflector mirror referenced Mr is shown in FIG. 1 merely as one possibility and that it is not absolutely necessary. It is shown in FIG. 1 purely for convenience in the representation of the drawing by expanding elements making up the device. It is thus entirely possible, that as a result of miniaturization, the device as finally embodied does not need this mirror Mr.

A sensor 50 is also provided for determining the rotation of the eye 1 relative to its orbit 2, this sensor being suitable for outputting 51 a signal representative of such rotation, and means 60 are provided for applying the signal delivered at the output 51 from the sensor 50 to the input 21 of the treatment optical projector 20 so that the image light beam 22 is projected onto a location of the mirror 30 that is a function of the rotation of the eye 1 in its orbit 2, in such a manner that the image as reflected on the mirror is created directly on the retina of the eye, as shown diagrammatically in FIGS. 2 and 3.

In a particularly advantageous embodiment that enables the above-defined objects to be achieved, the mirror 30 is in the form substantially of a paraboloid of revolution having its focal point 32 coinciding substantially with the center of rotation 5 of the eye 1 in its orbit 2.

Such a mirror may have various structures, for example the structure of an optical mirror with a reflecting surface in the form of a paraboloid of revolution. Nevertheless, and in preferred manner, because of its very small size compared with the embodiment mentioned above, the mirror 30 may be a holographic mirror, i.e. it may be formed on a plane surface. Such a mirror is itself well known to persons skilled in the art.

As shown in FIG. 1, the mirror 30 is positioned relative to the orbit 2 of the eye 1 in such a manner that the image light beam 22 is reflected by the mirror 30 and then focused by the lens 7 on the retina 8, at a location that is not situated in the zone 9 when the device is used for improving the vision of an eye suffering from ARMD.

Persons skilled in the art will have no difficulty in making a device of the invention as described above, in particular on referring to the content of the above-referenced patent in the name of the Applicant.

The operation of the device can be deduced without difficulty from the present description and from the two accompanying FIGS. 2 and 3.

Nevertheless, it is specified that the image generated by the projector 20 may be taken in a field that is larger than the field of view of the eye. A window corresponding to no more than the field of view is then opened, and in that window, an image is generated as taken by the camera that is situated, by way of example, on glasses adapted to the treatment corresponding to the visual needs of the eye 1 (cf. FR 2 964 755).

If so desired, the user may act on the zoom of the camera in order to focus on an item and/or a portion of the landscape. The image that is sent is matched to the user's best angle of vision formed between the central vision represented by the center of the pupil and the still usable peripheral vision of the retina.

Automatic calibration is performed when the device is put into operation. The angle obtained by the calibration is then stored in the memory of the microprocessor controlling the above-described projector 20 and it is used during projection.

As mentioned in the introduction to the present description, the device may find a very advantageous application in improving the vision of a human being having the retina 8 of at least one eye presenting a zone 9 that suffers from age-related macular degeneration (ARMD).

However, the invention can find applications in numerous other industrial, military, and civilian fields when there is the need for improved vision, e.g. of the "augmented reality" type for maintenance applications in the automobile industry, in aviation, when searching on storage shelves, etc., in order to assist surgeons by giving them information about organs that are not directly visible but that are involved in the surgery, for better informing people in the field of navigation on foot, by road, in the air, etc., for searching for locations by superposing images on the real images seen by the user, etc.

The structural and functional descriptions given above show that the objects of the invention are achieved, in particular in that the device no longer has any significant moving parts and/or elements, thus enabling it to be better miniaturized and therefore incorporated more easily in an element of the "glasses" type.

The invention claimed is:

1. A device for improving the vision of an eye (1) of a human being, said eye pivoting in its orbit (2) and including a lens (7) and a retina (8), the device comprising:
   optical means (10) for forming at least one image of a scene to be viewed (11);
   a controllable treatment optical projector (20) mounted to co-operate (13, 14) with said optical means (10), said projector being suitable for outputting (24) said image in the form of an image light beam (22), and for being controlled by a signal of determined value applied to a control input (21) so that the image light beam (22) is deflected through a deflection angle that is a function of the value of said signal;
   a mirror (30);
   means (40-1, 40-2) for linking said mirror (30) with the orbit (2) and with the treatment optical projector (20) so that the optical axis (31) of the mirror (30) passes substantially through the center of rotation (5) of said eye (1), and so that the mirror (30) lies on the light path of the image light beam (22); and
   a sensor (50) for determining the rotation of said eye (1) relative to its orbit (2), the sensor being suitable for outputting (51) a signal representative of the rotation;
   the device further comprising means (60) for applying said signal delivered at the output (51) of the sensor (50) to the input (21) of the treatment optical projector (20) so that the image light beam (22) is projected onto a location of said mirror (30) that is a function of the rotation of said eye (1) relative to its orbit (2).

2. A device according to claim 1, wherein said mirror (30) is substantially in the form of a paraboloid of revolution having its focal point (32) coinciding substantially with the center of rotation (5) of the eye (1) in its orbit (2).

3. A device according to claim 2, wherein said mirror (30) is a holographic mirror.

4. A device according to claim 2 for improving the vision of an eye (1) of a human being, the eye having a zone (9) of its retina (8) suffering from age-related macular degeneration (ARMD), wherein said mirror (30) is positioned relative to the orbit (2) in such a manner that the image light beam (22) is reflected by the mirror (30) and then focused by the lens (7) onto the retina (8) at a location that is not situated in said zone (9).

5. A device according to claim 1, wherein said mirror (30) is a holographic mirror.

6. A device according to claim 5 for improving the vision of an eye (1) of a human being, the eye having a zone (9) of its retina (8) suffering from age-related macular degeneration (ARMD), wherein said mirror (30) is positioned relative to the orbit (2) in such a manner that the image light beam (22) is reflected by the mirror (30) and then focused by the lens (7) onto the retina (8) at a location that is not situated in said zone (9).

7. A device according to claim 1, wherein the optical projector (20) is a projector such as that sold by the supplier "Texas Instruments" under the trademark "DMD Discovery™ 3000".

8. A device according to claim 1 for improving the vision of an eye (1) of a human being, the eye having a zone (9) of its retina (8) suffering from age-related macular degeneration (ARMD), wherein said mirror (30) is positioned relative to the orbit (2) in such a manner that the image light beam (22) is reflected by the mirror (30) and then focused by the lens (7) onto the retina (8) at a location that is not situated in said zone (9).

* * * * *